Oct. 22, 1946.  B. K. LYON  2,409,638
INSERT BOLT
Filed Aug. 7, 1944
Fig. I.
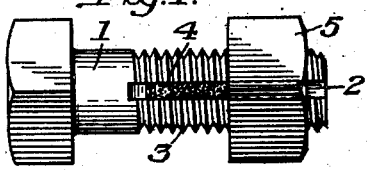
Fig. II.
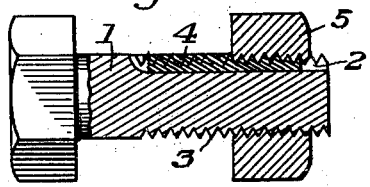
Fig. III.
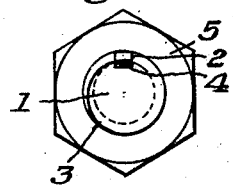
Fig. IV.
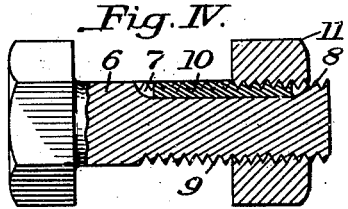
Fig. V.
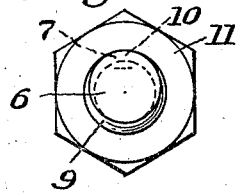
Fig. VI.
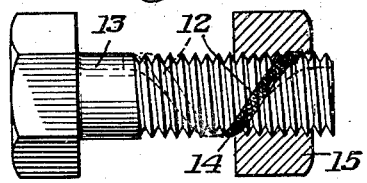
Fig. VII.
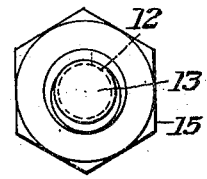
INVENTOR
Bruce K. Lyon
by William B. Wharton
his attorney Patented Oct. 22, 1946

2,409,638

UNITED STATES PATENT OFFICE 2,409,638

INSERT BOLT

Bruce K. Lyon, Grant, Nebr., assignor to Oliver Iron and Steel Corporation, Pittsburgh, Pa., a corporation of Pennsylvania Application August 7, 1944, Serial No. 548,365

2 Claims. (Cl. 151—7)

This invention relates to bolts, cap screws, and the like articles having a threaded shank for cooperation with the threaded bore in a nut or other structure.

The object of the invention is to provide in the shank of the bolt or screw an improved arrangement for preventing accidental relative movement between the shank of the bolt or screw and a threaded bore into which it has been run.

More specifically it is the object of my invention to simplify and improve a locking organization for bolts and screws of the sort in which the shank of such article is provided with a relatively shallow and relatively narrow longitudinally extended slot into which is set an insert strip of hard vulcanized fiber.

In accordance with my invention there is cut, or otherwise formed, in the threaded shank of the bolt, or like article, a longitudinally extended slot, which is so narrow that it subtends less than 45° around the periphery of the shank; and which extends radially inward for the entire depth of the threads and a short distance into the inner body of the shank. This slot extends for at least a substantial portion of the threaded region thereof; and whether the slot is continued to the end of the shank or is formed to begin at a point removed longitudinally from the end, the fiber insert strip desirably is pressed into it by force directed radially inward of the shank.

The thickness of the fiber insert strip is such that it extends radially outward approximately to or slightly beyond the apices of the shank threads, so that the action of the threads in the threaded bore of a nut or other structure with which the bolt or screw cooperates, not only cuts, or presses, threads in the strip as the shank and the bore are run relatively to each other, but also tends to spread the strip laterally to clinch it in the slot in which it lies securely to lock it in position without providing a key-form engagement between the insert strip and the sides of the slot. Even if the slot for the fiber insert is carried to the end of the shank, the insert strip desirably is terminated short of the shank terminal to give a short run of the threads before the operation of threading the insert strip is assumed.

In the accompanying drawing

Fig. I is an elevational view of the bolt of my invention in conjunction with a nut threaded thereon, the shank of the bolt being provided with a slot extending longitudinally from the extremity of the bolt shank along the threaded portion thereof.

Fig. II is a vertical sectional view taken through the bolt and its associated nut in the plane of the slot of Fig. I.

Fig. III is an end elevation of the bolt and nut shown in Figs. I and II.

Fig. IV is a view taken partly in elevation and partly in longitudinal section showing a modified form of the bolt in which the slot in the bolt shank which receives the fiber insert strip of the assembly does not extend completely to the extremity of the bolt shank.

Fig. V is an end elevation of the bolt and nut shown in Fig. IV.

Fig. VI is an elevational view showing a bolt having a slot, and a fiber strip inserted therein, extending helically of the bolt shank in a direction opposite to that of the bolt threads.

Fig. VII is an end elevational view of the bolt and nut assembly shown in Fig. VI.

Referring in detail to the drawing and initially to the showing of Figs. I to III inclusive, reference numeral 1 designates the shank of a bolt in which a relatively narrow and relatively shallow slot 2 extends longitudinally of the shank from the extremity thereof throughout the length of the shank which is provided with threads 3. This slot subtends an angle of about 30° at the axis of the bolt shank and is of a depth to extend radially of the shank throughout the depth of threads 3 and a slight distance further into the inner body of the shank. An insert strip 4 of hard vulcanized fiber lies in the slot 2, such strip being of a thickness to extend slightly beyond the apices of the threads 3. I have appreciated that such material is sufficiently elastic to exert a resilient force when deformed, but sufficiently plastic primarily to retain a shape into which it is pressed.

When there is relative running movement of the bolt with a cooperatively threaded bore, such as the bore of the nut 5 shown in the drawing, the threads of the bore cut, or press, threads in the fiber insert strip; and in so doing not only tend to compress the elastic substance of the strip, but also tend to spread it laterally firmly to engage it in the slot.

The engagement of the bolt shank with the threaded bore of the nut which is thus created is so tight as positively to preclude accidental disengagement of the bolt shank and the nut. It may be explained that this locking effect is caused not only by the resilient binding of the nut threads themselves in the relatively narrow strip of hard vulcanized fiber, but that the elasticity of such strip is sufficient to increase the frictional engagement between the threads of the nut, or the bore threads of a fixed structure into which the bolt is run, and the undeformed portions of the bolt threads. The hard vulcanized fiber insert strip retains approximately the form of the threads cut, or pressed, in it by the threaded bore with which the bolt shank cooperates, but possesses also sufficient elasticity similarly to engage the shank and a cooperative bore repeatedly should those elements be repeatedly separated and reengaged by international action.

The showing of Figs. IV and V is closely similar to that of Figs. I to III inclusive, the only substantial difference being that the shank 6 of the bolt is provided with a slot 7 which terminates short of the extremity of the bolt to leave adjacent that extremity a region 8 in which the threads 9 of the bolt shank are uninterrupted. These figures of the drawing show a similar insert strip 10 of hard vulcanized fiber in the slot 7, with threads cut in the strip throughout a portion of its length by a nut 11 identical with the nut 5 shown in the preceding figures of the drawing.

The portion of the bolt shank with uninterrupted threads provides a longitudinal backing for the insert strip at the end of the insert-receiving slot adjacent the extremity of the threaded shank, in addition to the backing provided at the end of the slot adjacent the head of the bolt or screw. It is of particular advantage in conjunction with an insert strip which initially is oversize radially of the shank, because it places a definite limit on the extent of the insert strip toward the end of the bolt shank and this assures that the bolt shank and a threaded bore are permitted to run relatively for a short distance before their movement is impeded by the necessity to imprint threads in the insert strip.

In Figs. VI and VII a slot 12 extends helically from the extremity of a bolt shank 13 throughout the entire threaded length of the shank, and there is a vulcanized fiber insert strip 14 pressed thereinto. A nut 15 identical with the nuts 5 and 11 of the preceding figures of the drawing is shown run onto the shank 13 of the bolt, and having cut its own threads in the insert strip 14. This nut 15, as is the case with the nuts in the preceding figures of the drawing, is representative of a member associated with the bolt shank which has a bore threaded cooperatively with the threading of the shank. In this modification of the bolt shank, the helical direction of the slot 12 and insert strip 14 gives a greater area of contact surface with the bore teeth of a nut or like threaded female member than is provided by the straight slots in the preceding figures of the drawing.

In Figs. IV and V and in Figs. VI and VII of the drawing, the slots are shown as of substantially the same width and depth as the slot in Figs. I to III inclusive of the drawing. It will also be noted that in the forms shown in Figs. IV and V and in Figs. VI and VII the insert strips are of such thickness that they extend on the shank a radial distance which brings their outer surfaces slightly beyond the apices of the shank threads. In these forms of bolt or cap screw there is, therefore, a clinching effect similar to that obtained in the form shown in Figs. I to III inclusive, the excess substance of the insert strip providing sufficient lateral spreading of the strip firmly to engage it in the slot in which it lies. Excess substance of the locking strip is required to obtain this clinching effect because in the cooperative running of the bolt shank and an associated member having a threaded bore, the threads in the associated bore as they cut, or press, threads in the insert strip also compress that strip both radially and longitudinally of the slot. It is the longitudinal compression of the strip which in such use causes the exertion of a yielding force on the threads of the shank and its associated member, so to increase frictional resistance between the thread surfaces as to insure against accidental disengagement of the cooperatively threaded members.

Because of the clinching effect provided by lateral expansion of excess substance of the insert strips in their slots, it is unnecessary that the insert strips and slots have a cross-sectional contour to provide interlocking engagement, and that the relative cross-sectional areas of the insert strips and the slots be exactly equal. Thus the slots may have sides which are parallel as shown, or which even diverge radially outward, and thus each of the slots has a width at the periphery of the shank at least equal to the width of the slot at the base thereof; and the insert strips as initially inserted may be of a different cross-sectional shape or even of slightly lesser width than the slots, without impairing the effectiveness of the locking effect in use of the bolt by loosening of the insert strip in its slot. It greatly simplifies the operation of cutting slots in the shanks of the bolts or screws, and greatly simplifies the engagement of the insert strips in the slots. This latter advantage rises from the fact that in my insert bolt the insert may be pressed into the slot therefor by force diverted radially inward of the bolt shank; and this assembly step may thus be a simple machine operation, avoiding the difficult operation of forcing a locking strip of dove-tail or like key form longitudinally into interlocking fitted engagement in a slot of complementary cross-sectional contour.

It is to be understood that the slots shown in each of the illustrated forms of bolt, and the insert strips in those slots may be duplicated around the periphery of the bolt. Also, if desired, the longitudinal extent of the slots and insert strips may be less than as shown in the drawing.

I claim as my invention:

1. In a cap screw or bolt having a shank threaded for running engagement with the cooperatively threaded shank of an associated member, a slot extended longitudinally in the said threaded shank and circumferentially less than 45° and terminated short of the extremity of the shank to leave in that terminal region of the shank an uninterruptedly threaded portion, said slot having a width at the periphery of said shank at least equal to the width of said slot at the base thereof, and a vulcanized fiber insert strip in said slot and adapted to be radially placed therein and extending radially of the shank at least approximately to the apices of the shank threads but not more than slightly beyond the apices of said shank threads to provide excess of substance when threaded, the said insert strip as threaded by the cooperative bore threads of an associated member being compressed both radially and longitudinally of the slot in which it lies and expanded laterally into firm engagement with the sides of the said slot.

2. In a cap screw or bolt having a shank threaded for running engagement with the cooperatively threaded shank of an associated member, a slot extended longitudinally in the said threaded shank and circumferentially less than 45°, said slot having a width at the periphery of said shank at least equal to the width of said slot at the base thereof, and a vulcanized fiber insert strip in said slot terminated short of the extremity of the shank and adapted to be radially placed in said slot and extending laterally of the shank at least approximately to the apices of the shank threads but not more than slightly beyond the apices of said shank threads to provide excess of substance when threaded, the said insert strip as threaded by the cooperative bore threads of an associated member being compressed both radially and longitudinally of the slot in which it lies and expanded laterally into firm engagement with the sides of the said slot.

BRUCE K. LYON.